United States Patent
Ma et al.

(10) Patent No.: US 11,405,393 B2
(45) Date of Patent: Aug. 2, 2022

(54) CALLS TO WEB SERVICES VIA SERVICE PROXY

(71) Applicant: Microsoft Technology Licensing, LLC, Redmond, WA (US)

(72) Inventors: Jin Ma, Redmond, WA (US); Linda Chen Gray, Kirkland, WA (US); Betsy McIntyre, Redmond, WA (US); Jun Chen, Redmond, WA (US); Elena Catrinescu, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 16/583,026

(22) Filed: Sep. 25, 2019

(65) Prior Publication Data

US 2021/0092119 A1    Mar. 25, 2021

(51) Int. Cl.
| | |
|---|---|
| *G06F 13/00* | (2006.01) |
| *H04L 9/40* | (2022.01) |
| *H04L 51/18* | (2022.01) |
| *H04L 67/02* | (2022.01) |

(Continued)

(52) U.S. Cl.
CPC .......... *H04L 63/0884* (2013.01); *H04L 51/18* (2013.01); *H04L 63/083* (2013.01); *H04L 63/0869* (2013.01); *H04L 67/02* (2013.01); *H04L 67/16* (2013.01); *H04L 67/2804* (2013.01)

(58) Field of Classification Search
CPC ... H04L 63/0884; H04L 51/18; H04L 63/083; H04L 63/0869; H04L 67/02; H04L 67/16; H04L 67/2804; H04L 67/28

USPC ................ 709/203, 229, 227, 228, 217–219; 726/2–9, 11–15, 17–21

See application file for complete search history.

(56) References Cited

U.S. PATENT DOCUMENTS

| | | |
|---|---|---|
| 7,444,536 B1 | 10/2008 | Jairath |
| 7,516,195 B2 | 4/2009 | Collet et al. |

(Continued)

OTHER PUBLICATIONS

Fallback Auth. in WebSphere Application Server with SPNEGO; Jun. 21, 2019.

(Continued)

*Primary Examiner* — Kenneth R Coulter
(74) *Attorney, Agent, or Firm* — Christopher J. Volkmann; Kelly, Holt & Christenson, PLLC

(57) ABSTRACT

Techniques to handle calls to web services via a service proxy are disclosed herein. In one embodiment, a technique includes an intermediate server receiving a request from a client device to the web service at a target server. In response to receiving the request, the intermediate server can authenticate the received request from the client device and upon successful authentication of the received request, forward the request to the targeted server and invoking the web service to process the forwarded request because the intermediate server is authenticated with the target server. The technique can also include receiving, at the intermediate server, data from the target server that represents execution results of the request by the web service at the target server. Upon receiving the data, the intermediate server can then forward to the client device, the data representing execution results of the request by the web service at the target server.

20 Claims, 7 Drawing Sheets

(51) Int. Cl.
*H04L 67/51* (2022.01)
*H04L 67/561* (2022.01)

(56) References Cited

U.S. PATENT DOCUMENTS

| | | | |
|---|---|---|---|
| 7,801,996 B2* | 9/2010 | Brunswig | G06F 9/547 |
| | | | 709/227 |
| 8,914,439 B2 | 12/2014 | Batey et al. | |
| 9,154,488 B2* | 10/2015 | Innes | H04L 63/08 |
| 9,755,889 B2 | 9/2017 | Griswold et al. | |
| 10,250,723 B2* | 4/2019 | Khanduja | H04L 69/26 |
| 2007/0061431 A1* | 3/2007 | Brunswig | H04L 67/16 |
| | | | 709/223 |
| 2014/0331297 A1 | 11/2014 | Innes et al. | |
| 2018/0302399 A1 | 10/2018 | Khanduja et al. | |

OTHER PUBLICATIONS

Use Another Auth. Method for External API Calls; Aug. 31, 2016, 5 pages.
Birman, et al., "Adding High Availability and Autonomic Behavior to Web Services", In Proceedings of the 26th International Conference on Software, May 23, 2004, 10 Pages.
Fang, et al., "Fault Toleranl Web Services", In Journal of Systems Architecture, vol. 53, Issue 1, Jan. 2007, 4 Pages.
Helpton, Shane; "How to Create a Server Failover Solution"; May 16, 2013.
Pathak, Mintu Monu; "How to Enable Failback Local Auth."; Jul. 27, 2018.
"Proxy Authentication using NTLM Example"; Feb. 15, 2019; 4 pages.
"International Search Report and Written Opinion Issued in PCT Application No. PCT/US20/038267", dated Oct. 1, 2020, 13 Pages.

* cited by examiner

CALLS TO WEB SERVICES VIA SERVICE PROXY

BACKGROUND

Corporations, schools, charities, government entities, and other organizations often deploy private computer networks commonly referred to as intranets. Such intranets can include servers, network devices, or other suitable devices under the control of an organization for deploying web-based solutions to allow members of the organization to securely share information and communicate with one another within the enterprise. For example, a file management system can be configured to store, track, or otherwise manage documents in an organization. In another example, an email exchange can be configured to facilitate sending and receiving of emails among members of the organization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A web service is a computing service that is configured to receive requests for data (e.g., documents, photos, or other suitable types of files) and in response, provide suitable requested data via a computer network according to a web protocol such as Hypertext Transfer Protocol ("HTTP"). Web services can be deployed to facilitate access to various types of data or resources in an intranet, internet, or other suitable types of computer networks. For example, a web service on a file server can be configured to provide a web-based interface for accessing files stored in a database managed by the file server. During operation, a user can submit a request via a computer network for a file stored in the database using, for instance, a "GET" command according to HTTP along with a Universal Resource Locator ("URL") of the file in the database. In response to receiving the "GET" command, the web service at the file server can be configured to authenticate the request, retrieve the requested file identified by the URL, and provide the requested file to the user via the computer network.

Authentication with a web service at a server can typically be implemented via two approaches: client to server and server to server. A client to server approach involves a client (e.g., an email client on a client device of a user) submitting a request with suitable authentication credentials such as authentication tokens. Upon receiving the request, the web service at the server can authenticate the request based on an authentication token or other authentication credentials in the request. Upon successful authentication, the web service can perform suitable tasks in response to the received request. A server to server approach involves two servers (e.g., an email server and a file server) exchanging digital certificates issued by a certificate authority (e.g., Comodo). Based on authenticating the digital certificates, the servers may establish mutual trust and allow execution of suitable tasks by the web service in response to receiving requests from the other server.

Under certain circumstances, the server to server approach may be used as a backup to facilitate operations via a web service. For example, when a user clicks on a link in an email via an email client to request a file from the web service at the file server, a client to server call to the web service may not be available for various reasons. For instance, a valid authentication token to the web service may not be available at the client device. As such, when a client to server call fails or otherwise not available, a server to server call may be used as a backup solution. For example, upon unsuccessful call to the web service from the client device, the email client can transmit a request for the file to an email server via an Application Programming Interface ("API") of the email server. In turn, the email server can process the received request by, for instance, identifying the requested file, determining a suitable URL of the file in a database, and formatting a valid request to the web service according to a configuration, protocol, and/or other types of information of the file server. The email server can then transmit the generated request to the file server via another API of the file server. Given that the email server and the file server are authenticated with each other, the web service at the file server can then process the received request from the email server and provide the requested file to the email server, which in turn forward the received file to the client device of the user.

The foregoing implementation of the server to server approach as a backup to client to server approach can be difficult to implement and maintain. For example, when configuration or other parameters of the web service at the file server changes, code for both the email client at the client device and the email server may be changed in order to conform with the change at the file server. Modifying code for the client device can be relatively straightforward. However, modifying code for the email server may be more involved than modifying code for the client device because modifications need to be compatible with other functions and services of the email server. As such, deployment and/or update to the server to server approach may be time consuming, inefficient, and prone to errors.

Several embodiments of the disclosed technology can address certain aspects of the foregoing difficulty by deploying a service proxy on an intermediate server (e.g., the email server) for implementing a server to server approach with a target server (e.g., the file server). Though the disclosed technology is described below using the email server and the file server as examples of intermediate and target servers, respectively, for implementing the server to server approach, in other embodiments, the disclosed technology can be implemented in other computing systems with web servers, database servers, storage servers, or other suitable types of servers configured as intermediate or target servers.

In certain implementations, the service proxy can be implemented at the email server and include an authentication component and an interface component operatively coupled to each another. In some embodiments, the authentication component can include suitable modules that are configured to (i) authenticate the email client on the client device to the service proxy at the email server; and (ii) authenticate the email server to the file server. For example, a client module can be configured to authenticate the email client on the client device to the email server based on authentication tokens while a server module can be configured to exchange digital certificates with the file server in order to authenticate at least the email server to the file server. In other embodiments, one or both of the client or server modules may be separate from each other or even omitted from the authentication component of the service proxy.

The interface component can be configured receive a request for a file from the email client on the client device. The received request for the file can be a request formatted according to an API of the web service at the file server. In certain examples, the received request can include a URL of the file, a header identifying the email client, a command of file operation (e.g., GET), and/or other suitable parameters. In other examples, the received request can include other suitable types of data and/or metadata. Upon receiving the request, the interface component can be configured to identify the email client (e.g., based on a value in a header field of the request), create a record for tracking the received request, and forward the request directly to the file server without modifying content of the request. Upon receiving the request, the file server can be configured to execute the included command (e.g., GET) in the request because the email server and the file server have been authenticated with each other. The file server can then return the requested file to the service proxy at the email server, which in turn forwards the file to the email client at the client device based on, for instance, the record identifying the email client.

Several embodiments of the service proxy at an intermediate server (e.g., the email server) can allow fast deployment and/or update of web services provided by a target server (e.g., the file server) according to server to server approach. Unlike previous implementations of the server to server approach, the service proxy at the intermediate server does not involve processing the received request according to certain business and/or configuration information of the web service at the target server. Instead, the service proxy simply forwards the request to the target server for further processing. As such, when a change to the web service at the target server occurs, only code for the email client at the client device may be changed to conform with the updated web service at the target server. As discussed above, developing and deploying code updates for client devices may be more agile than for servers. As such, changes to the web services at the target server can be efficiently and cost-effectively accommodated by modifying only the code for the client device.

DETAILED DESCRIPTION

Figure 1:
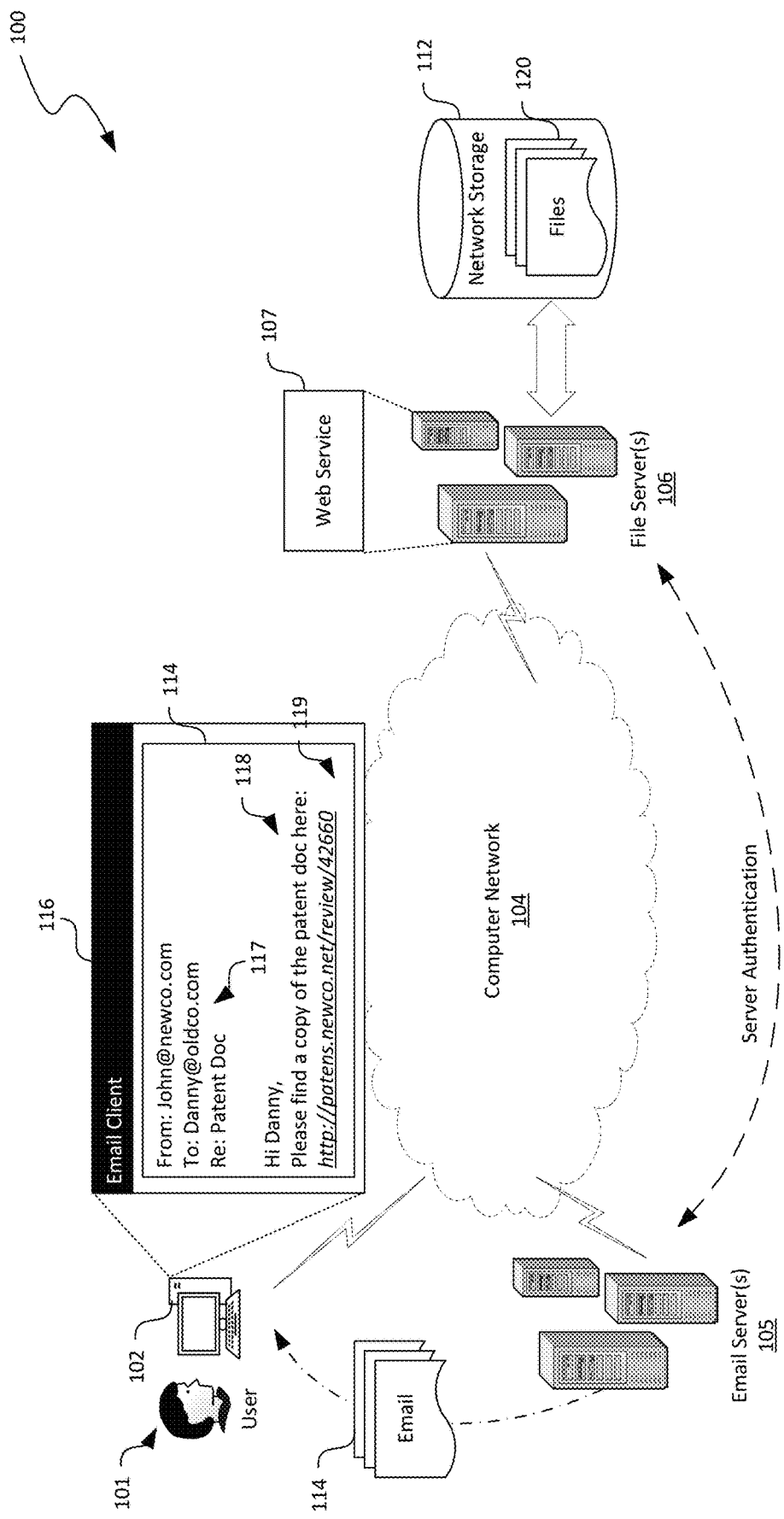
FIG. 1 is a schematic diagram illustrating a computing system implementing calls to web services via a service proxy in accordance with embodiments of the disclosed technology.

Certain embodiments of systems, devices, components, modules, routines, data structures, and processes for implementing calls to web services via a service proxy in computing systems are described below. Though the disclosed technology is described below using an email server and a file server as examples of an intermediate server and a target server, respectively, in other examples, the disclosed technology can be implemented in computing systems with web servers, database servers, storage servers, or other suitable types of servers each configured as an intermediate server or a target server. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "web service" generally refers to a computing service that is configured to receive requests for data (e.g., documents, photos, or other types of files) and in response, provide suitable requested data via the computer network according to a web protocol such as Hypertext Transfer Protocol ("HTTP"). For example, a web service provided by a file server can be configured to provide a web-based interface for accessing one or more files stored in a database managed by the file server. During operation, a user can submit a request via the computer network for retrieving, uploading, or performing other suitable actions on a file stored in the database using, for instance, "GET," "PUT," "POST," or other suitable commands according to HTTP with a Universal Resource Locator ("URL") of the file. In response to the receiving the command, the web service at the file server can be configured to authenticate the request, perform actions on the requested file identified by the URL to, for instance, provide the requested file to the user via the computer network.

Also used herein, an "authentication token" generally refers to a collection of data representing security credentials for secured access to web services and/or other suitable computing resources. An authentication token can identify a user, a user's group, a user's privileges, and, in some cases, a particular application. For example, once a user authenticates to a computing service, for instance, an email service at an email server, an access token to the email service can be created and cached on a client device or other suitable locations.

As used herein, the term "email server" generally refers to a computer dedicated to running such applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more inboxes for corresponding users. One example email server can be an Exchange server provided by Microsoft Corporation of Redmond, Wash.

Further used herein, the term "file server" generally refers to a computer that is configured to manage storage, versioning, update, and/or other suitable aspects of digital data organized as files and stored in a network storage. A file server can provide a web service that allows an authenticated user to retrieve, edit, upload, and/or perform other suitable actions on the files in the network storage. One example file server can be a SharePoint server provided by Microsoft Corporation of Redmond, Wash.

Authentication with a web service at a target server (e.g., a file server) can typically implement two approaches: client to server and server to server. A client to server approach involves a client (e.g., an email client on a client device) submitting a request with suitable authentication credentials such as authentication tokens to the target server. Upon receiving the request, the web service at the target server can authenticate the request based on an authentication token or other authentication credentials included with the request. Upon successful authentication, the web service can perform suitable tasks in response to the received request, such as executing a command included in the request. A server to server approach involves two servers exchanging digital certificates issued by a certificate authority (e.g., Comodo). Based on authenticating the digital certificates, the servers may establish trust of requests from each other and allow execution of suitable tasks by the web service in response to receiving requests from the other server.

Under certain circumstances, the server to server approach may be used as a backup to facilitate data operations via the web service. However, the server to server approach as a backup to client to server approach can be difficult to implement and maintain. For example, when configuration or other parameters of the web service at the file server changes, code for both the email client at the client device and the email server may need to change in order to conform with the change at the file server. Modifying code for the client device may be relatively straightforward. However, modifying code for the email server may be more involved because the modifications need to be compatible with other functions and service of the email server. As such, code updates to the server to server approach may be time consuming, inefficient, and prone to errors.

Several embodiments of the disclosed technology can address certain aspects of the foregoing difficulty by deploying a service proxy on an intermediate server (e.g., an email server) for implementing a server to server approach with a target server, such as the file server. In certain implementations, the service proxy can be configured receive a request for a file from a client (e.g., an email client on a client device) and forward the request directly to the file server with little or no modification to the content of the request. Upon receiving the request, the file server can be configured to execute a command (e.g., GET) included in the request because the email server and the file server have been authenticated with each other. The file server can then return the requested file to the service proxy at the email server, which in turn forwards the file to the email client at the client device based on, for instance, the record identifying the email client.

Several embodiments of the service proxy can thus allow fast deployment and/or code updates to the web service provided by a target server according to server to server approach. The service proxy at an intermediate server does not process the received request according to certain business and/or configuration information of the web service at the target server. Instead, the service proxy simply forwards the request to the target server for further processing. As such, when a change to the web service at the target server occurs, only code for the client needs to be changed to conform with the change in the web service, and thus enabling efficient and speedy deployment of code updates for conforming to the web service, as described in more detail below with reference to FIGS. 1-5.

The descriptions below with respect to FIGS. 1-5 use an email server and a file server as an example intermediate server and a target server, respectively, to illustrate certain aspects of the disclosed technology. The email and file servers are mere examples of various types of servers with one-way or two-way authentication that may implement aspects of the disclosed technology. In other examples, the disclosed technology can be implemented in computing systems having web servers, database servers, storage servers, or any other suitable types of servers configured as intermediate or target servers that are authenticated to one another in one-way, two-way, or other suitable fashions.

FIG. 1 is a schematic diagram illustrating an example computing system 100 implementing calls to web services via a service proxy at an intermediate server in accordance with embodiments of the disclosed technology. As shown in FIG. 1, the computing system 100 can include a computer network 104 interconnecting a client device 102, one or more email servers 105, and one or more file servers 106 (referred to as "email server 105" and "file server 106" herein for simplicity). The file server 106 is also interconnected with a network storage 112 containing data organized as multiple files 120. The computer network 104 can include an intranet, a wide area network, the Internet, or other suitable types of network. Even though particular components of the computing system 100 are shown in FIG. 1, in other embodiments, the computing system 100 can also include additional and/or different components or arrangements. For example, in certain embodiments, the computing system 100 can also include web servers, database servers, storage servers, additional network storage devices, network devices, and/or other suitable components (not shown) in addition to or in lieu of those shown in FIG. 1. In other examples, the file server 106 may be at least partially integrated into the email server 105 or vice versa.

The client device 102 can include a computing device that facilitates a user 101 to access computing services provided by the email server 105, the file server 106, or other components of the computing system 100 via the computer network 104. In the illustrated embodiment, the client device 102 includes a desktop computer. In other embodiments, the client device 102 can also include a laptop computer, tablet computer, or other suitable computing device. Even though only one user 101 is shown in FIG. 1 for illustration purposes, in other embodiments, the computing system 100 can facilitate any suitable number of users 101 to access computing services provided by the computing system 100.

The client device 102 can include suitable hardware/ software to provide various computer applications and/or services. For example, as shown in FIG. 1, the client device 102 can execute suitable instructions to provide an email client 116 configured to compose, view, forward, or perform other suitable operations. In certain embodiments, the email client 116 can be a standalone email client application, such as Microsoft Outlook®. In other embodiments, the email client 116 can also be a web-based email client such as Gmail provided by Google Inc., of Mountain View, Calif. In the illustrated example, the email client 116 outputs an example email 114 from "John@newco.com" to "Danny@newco.com." The example email 114 can include a header 117 with various fields such as "From:," "To:," and "Re:," and an email body 118 containing a web link 119 to a file 120 in the network storage 112, i.e., "http://patens-.newco.net/review/42660." As discussed in more detail below with reference to FIG. 2, upon actuating the web link 119 by the user 101, a service caller 130 (shown in FIG. 2) can be configured to generate and transmit a request to either the file server 106 or the email service 105 for invoking a web service at the file server 106 via a client to server or a server to server approach, respectively.

The email server 105 can be configured to facilitate operations of email client 116 on the client device 102. For example, as shown in FIG. 1, the email server 105 can be configured to forward one or more emails 114 to the client device 102 to be outputted in the email client 116 on the client device 102. In another example, the email server 105 can also be configured to facilitate composition and transmission of emails 114 from the client device 102 to one or more other client devices 102 (not shown). As discussed in more detail below with reference to FIGS. 3A and 3B, the email server 105 can also include a service proxy 131 (shown in FIG. 3A) that is configured to facilitate forwarding of requests to the file server 106 and invoking the web service at the file server 106 via a server to server approach.

The file server 106 can be configured to provide a web service 107 that facilitates file reception, storage, forwarding, and other related functionalities. For example, the web service 107 can be configured to authenticate a received request for a file 120 based on an authentication token. Upon authenticating the request, the web service 107 can retrieve the requested file 120 from the network storage 112 and provide the file 120 in response to the request. In another example, the web service 107 may skip the authentication operation if the request is received from a trusted source, such as the email server 105. Operations and functional components of the client device 102 and the email server 105 are described in more detail below with reference to FIGS. 2-3B.

In the illustrated embodiment in FIG. 1, the email server 105 and the file server 106 can be mutually authenticated by, for instance, exchanging suitable digital certificates. As such, the email server 105 is a trusted source to the file server 106 and vice versa. In other embodiments, the email server 105 can be authenticated to the file server 106 but the file server 106 may not be authenticated to the email server 105. As such, the email server 105 is a trusted source to the file server 106 but the file server 106 is not a trusted source of the email server 105.

Figure 2:
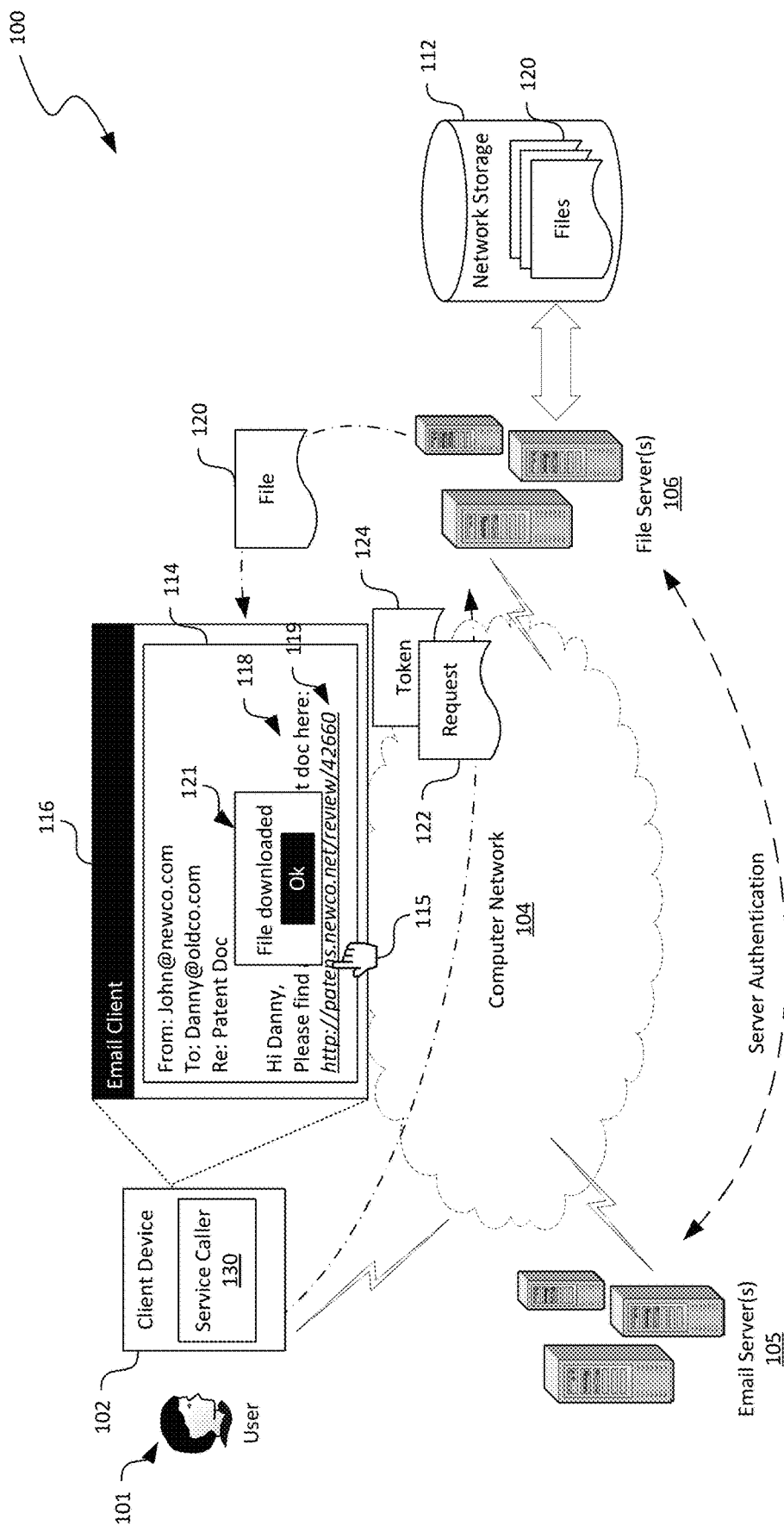
FIG. 2 is a schematic diagram illustrating certain hardware/software components of the computing system of FIG. 1 during operations of a client to server call in accordance with embodiments of the disclosed technology.

FIG. 2 is a schematic diagram illustrating certain hardware/software components of the computing system 100 of FIG. 1 during operations of a client to server call in accordance with embodiments of the disclosed technology. In FIG. 2, only certain components of the computing system 100 of FIG. 1 are shown for clarity. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the client device 102 can be configured to execute suitable instructions to provide a service caller 130 that is configured to invoke a call to web services, such as the web service 107 (FIG. 1) provided by the file server 106. In certain embodiments, the service caller 130 can be implemented as a part of the email client 116. In other embodiments, the service caller 130 can be implemented as a component of an operating system on the client device 102, a standalone application, an add-on to the email client 116, or in other suitable forms.

The service caller 130 can be configured to detect a user input from the user 101 that represents a request to invoke a web service. For example, as shown in FIG. 2, upon detecting a click (as represented by the cursor 115) by the user 101 on the web link 109 in the displayed email 114, the service caller 130 can be configured to generate a request 122 to invoke the web service 107 on the file server 106. In certain embodiments, the web service 107 can be configured as an API at the file server 106. The request 122 can thus include data in a data structure corresponding to a data structure of the API. For instance, the request 122 can contain data including an identification of a file, a Universal Resource Locator ("URL") of the file, and a command related to an operation to be performed on the file 120 by the web service 107. In other embodiments, the web service 107 can be configured in other suitable manners.

Upon detecting the user input, the service caller 130 can also be configured to determine whether a valid authentication token to the file server 106 is accessible by the service caller 130. For example, a valid authentication token may be cached on the client device 102. In another example, a valid authentication token may be accessible in a network location (e.g., a network database). In further examples, a valid authentication token may be provided on an ad hoc basis by, for instance, requesting the user to login, or via other suitable ways.

In response to determining that a valid authentication token 124 to the file server 106 is available to the service caller 130 on the client device 102, the service caller 130 can transmit the request 122 and the authentication token 124 to the file server 106 based on, for instance, a URL of the web link 119, i.e., "http://patens.newco.net/review/42660." Upon receiving the request 122 and the authentication token 124, the web service 107 at the file server 106 can authenticate the request 122 based on the authentication token 124, and upon successful authentication, perform an action included in the request 122. For example, in the illustrated embodiment, the file server 106 provides a copy of a file 120 as a download to the client device 102. In the illustrated example, the email client 116 outputs a notification 121 indicating to the user 101 that a file download is completed. In other examples, the email client 116 can be configured to render and output content of the downloaded file 120, perform virus scan on the downloaded file 120, and/or perform other suitable operations.

Under certain circumstances, a valid authentication token 124 to the file server 106 may not be available to the service caller 130. For example, the client device 102 may adopt a security model that is different than that of the file server 106. In another example, the client device 102 may implement a security platform that is different than that of the file server 106. As such, a valid authentication token 124 to the file server 106 may not be accessible by the service caller 130 on the client device. Thus, in response to determining that a valid authentication token 124 to the file server 106 is not available to the service caller 130 on the client device 102, the service caller 130 can be configured to transmit the request 122 to the email server 105 for invoking the web service 107 following a server to server approach, as described in more detail below with reference to FIGS. 3A and 3B.

Figure 3A:
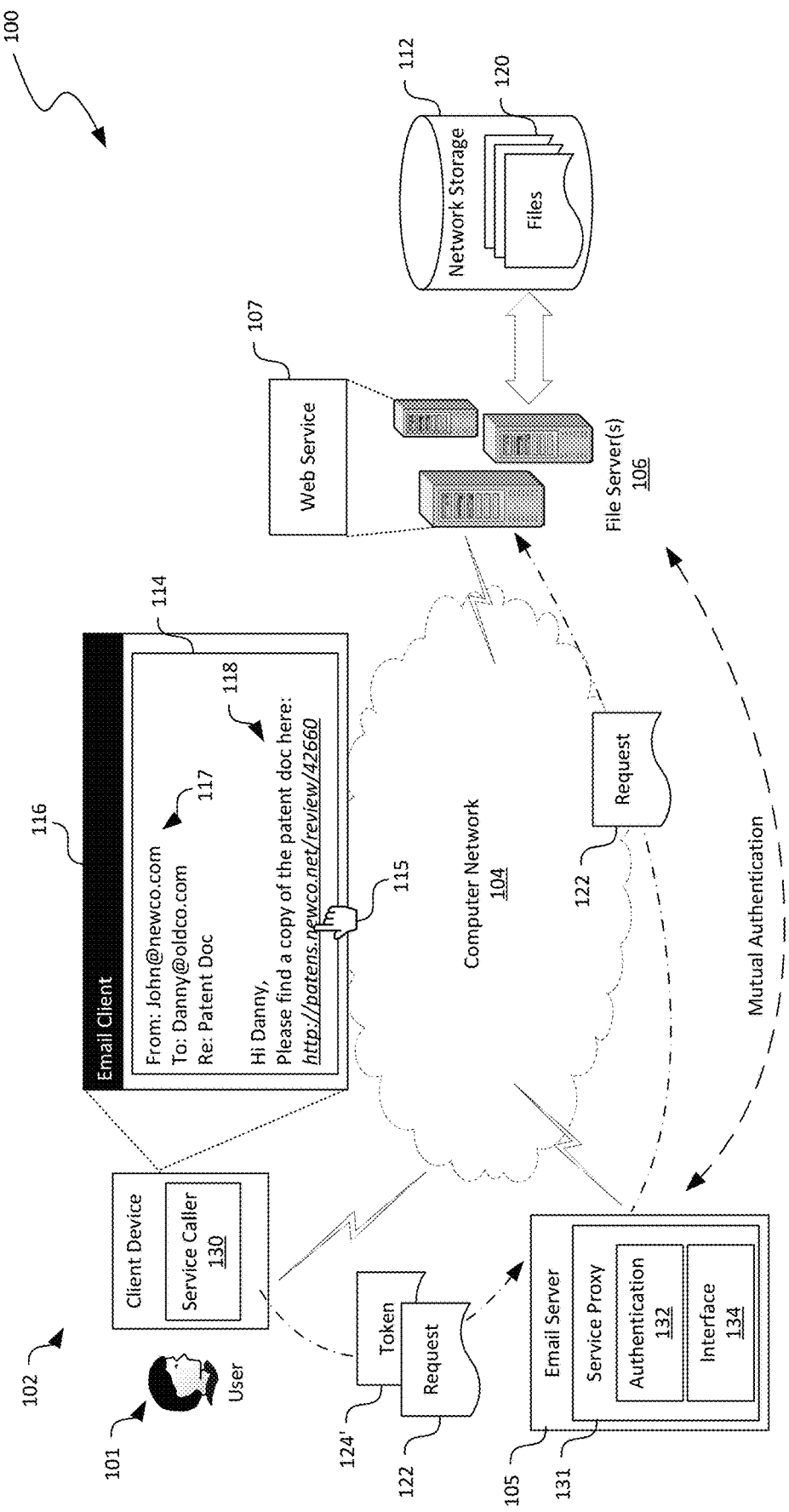
FIGS. 3A and 3B are schematic diagrams illustrating certain hardware/software components of the computing system of FIG. 1 during operations of a server to server call in accordance with embodiments of the disclosed technology.
Figure 3B:
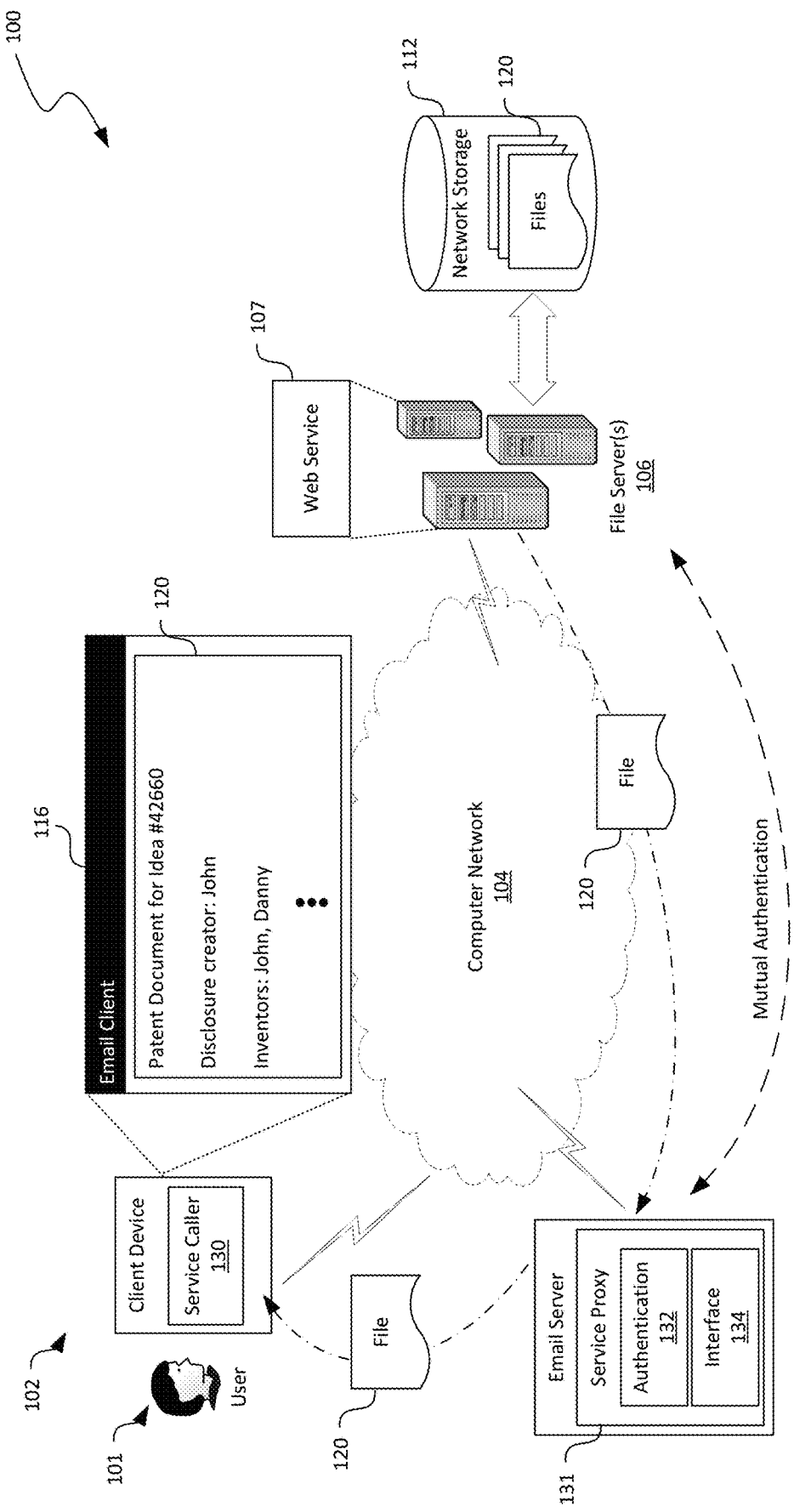

As shown in FIG. 3A, in response to determining that a valid authentication token 124 to the file server 106 is not available to the service caller 130 on the client device 102, the service caller 130 can be configured to transmit the request 122 with another token 124' to the email server 105. The email server 105 can include a service proxy 131 that is configured to forward the received request 122 to the file server 106. In the illustrated embodiment, the service proxy 131 includes an authentication component 132 and an interface component 134. In certain embodiments, the authentication component 132 can include suitable modules that are configured to (i) authenticate the email client 116 on the client device 102; and (ii) authenticate the email server 105 to the file server 106. For example, a client module (not shown) can be configured to authenticate the email client 116 on the client device 102 based on the authentication token 124' while a server module (not shown) can be configured to exchange digital certificates with the file server 106 in order to authenticate each other. In other embodiments, one or both of the client or server modules may be separate from other components of the service proxy 131.

The interface component 134 can be configured receive the request 122 for a file 120 from the email client 116 on the client device 102. The received request 122 for the file 120 can be a request 122 formatted according to an API of the web service 107 at the file server 106. In certain examples, the received request 122 can include a URL of the file, a header identifying the email client 116, a command of file operation (e.g., GET), and/or other suitable parameters. In other examples, the received request 122 can include other suitable types of data and/or metadata.

Upon receiving the request 122, in certain embodiments, the interface component 134 can be configured to identify the email client 116 (e.g., based on a value in a header field of the request 122), create a record (not shown) for tracking the received request 122, and forward the request 122 directly to the web service 107 at the file server 106 without modifying content of the request 122. In other embodiments, the interface component 134 can be configured to remove at least a portion of the header and/or append additional data or metadata to the request 122 before forwarding the request 122 to the web service 107 at the file server 106.

Upon receiving the request 122, the file server 106 can be configured to execute the included command (e.g., GET) in the request 122 without requiring additional authentication because the email server 105 and the file server 106 have been authenticated with each other. As such, the file server 106 can deem the received request 122 as being from a trusted source. In the illustrated example in FIG. 3B, the file server 106 can then return the requested file 120 to the service proxy 131 at the email server 105, which in turn forwards the file 120 to the email client 116 at the client device 102 based on, for instance, the record identifying the email client 116. In the illustrated example in FIG. 3B, the email client 116 can be configured to render and surface content of the file 120 received from the service proxy 131 inside the email client 116. In other examples, the email client 116 and/or the service caller 130 can be configured to save the file 120 as a downloaded file or perform other suitable actions in addition to or in lieu of surfacing the content of the file 120 in the email client 116.

Several embodiments of the service proxy 131 can thus allow fast deployment and/or update of web service 107 provided by the file server 105 according to the server to server approach. Unlike previous implementations of the server to server approach, the service proxy 131 at the email server 105 does not involve processing the received request 122 according to certain business and/or configuration information of the web service 107 at the file server 106. Instead, the service proxy 131 simply forwards the request 122 to the file server 106 with little or no modification for further processing. As such, when a change (e.g., an API modification) to the web service 107 at the file server 106 occurs, only code for the email client 116 at the client device 102 may change to conform with the updated web service 107 at the file server 106. Developing and deploying code for client devices 102 may be more agile than code for servers. As such, changes to the web service 107 at the file server 105 may be efficiently and cost-effectively accommodated by modifying only the code for the service caller 130 at the client device 102.

FIGS. 4A-4D are flowcharts illustrating processes of calls to web services via a service proxy in accordance with embodiments of the disclosed technology. Though the processes are described below in the context of the computing system 100 in FIGS. 1-3B, embodiments of the processes may be implemented in computing systems with additional and/or different components.

Figure 4A:
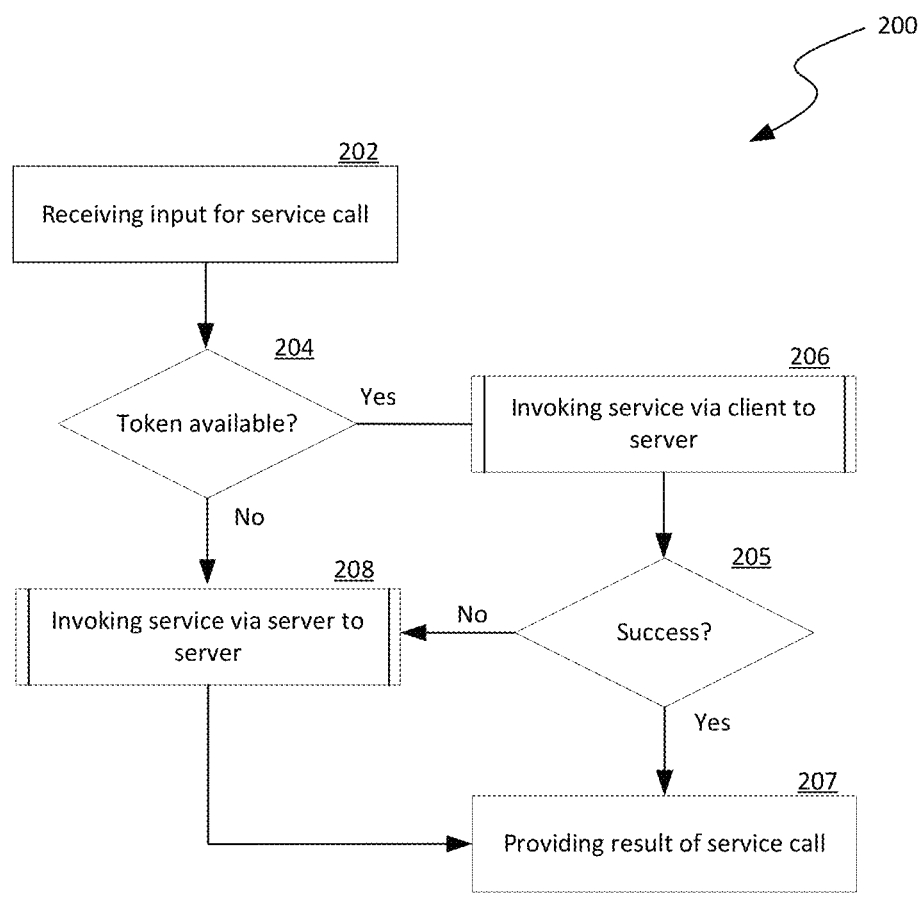
FIGS. 4A-4D are flowcharts illustrating processes of calls to web services via a service proxy in accordance with embodiments of the disclosed technology.

As shown in FIG. 4A, a process 200 can include receiving an input for a service call to a web service at a target server at stage 202. The input can be, for example, a click on a web link included in an email body of an email, such as that shown in FIG. 2. The input can also be, in other examples, a click or tap on a web link included on a webpage, instant message, text message, or other suitable types of electronic document. The process 200 can then include a decision stage 204 to determine whether an authentication token to the target server is accessible. In certain embodiments, an authentication token may be cached on a client device, on a network location, or provided on an ad hoc basis. In other embodiments, an authentication token may be accessible via other suitable channels.

In response to determining that the authentication token is available, the process 200 proceeds to invoking web service at the target server according to a client to server approach at stage 206. Operations of invoking web service at the target server according to a client to server approach are described in more detail below with reference to FIG. 4B. In response to determining that the authentication token is not available, the process 200 proceeds to invoking web service at the target server according to a server to server approach at stage 208. Operations of invoking web service at the target server according to a server to server approach are described in more detail below with reference to FIG. 4C. As shown in FIG. 4A, the process 200 can include another decision stage 205 to determine whether invoking the web service according to a client to server approach is successful. In response to determining that invoking the web service according to a client to server approach is not successful, the process 200 proceeds to invoking the web service according to a server to server approach at stage 208. Otherwise, the process 200 proceeds to providing results of invoking the web service to the user at stage 207.

Figure 4B:
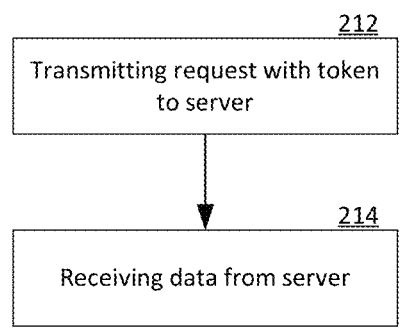

As shown in FIG. 4B, operations of invoking the web service according to a client to server approach can include transmitting a request identifying one or more files and file operations to a target server (e.g., a file server) with the authentication token at stage 212. The operations can then include receiving data representing execution results of invoking the web service at stage 214, as described in more detail above with reference to FIG. 2.

Figure 4C:
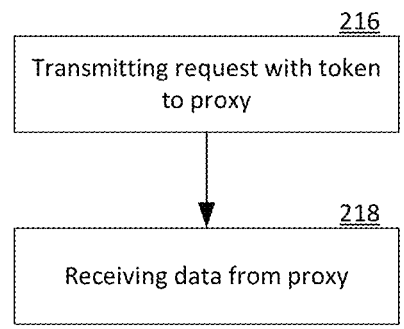

As shown in FIG. 4C, operations of invoking the web service according to a server to server approach can include transmitting a request identifying one or more files and file operations to an intermediate server with the authentication token at stage 216. Based on the received request, the intermediate server can be configured to forward the request to a target server, as described in more detail below with reference to FIG. 4D. The operations can then include receiving data representing execution results of invoking the web service from the intermediate server at stage 218, as described in more detail above with reference to FIGS. 3A and 3B.

Figure 4D:
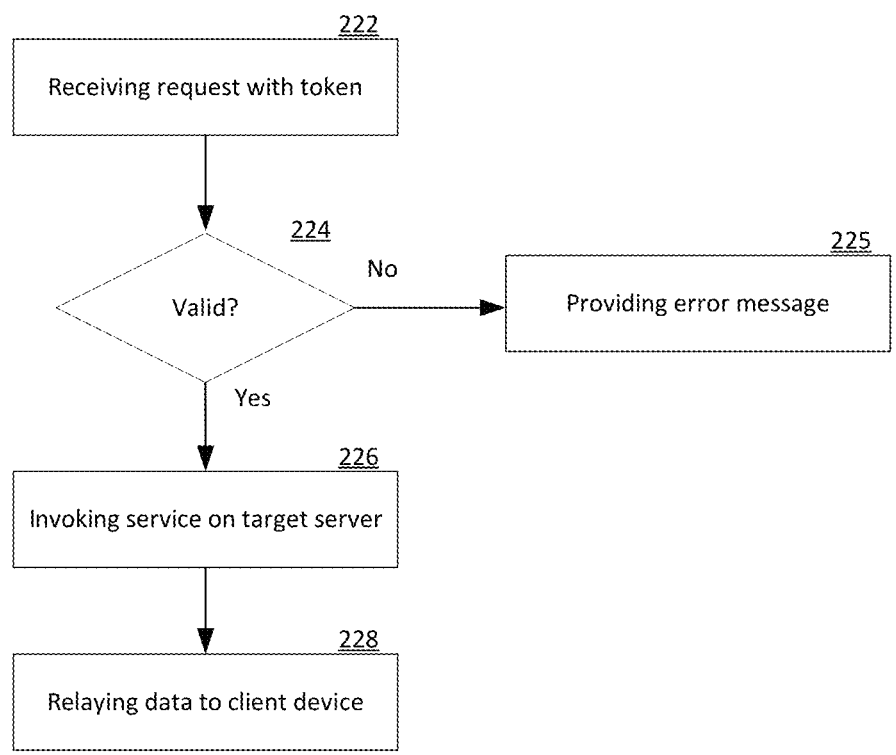

As shown in FIG. 4D, operations performed by the intermediate server can include receiving the request with an authentication token at stage 222. The operations can then include a decision stage 224 to determine whether the authentication token is valid. In response to determining that the authentication token is not valid, the operations proceed to providing an error message at stage 225. In response to determining that the authentication token is valid, the operations proceed to invoking the web server on the target server based on the request at stage 226 and relaying data representing execution results of invoking the web service to the client device at stage 228, as described in more detail above with reference to FIGS. 3A and 3B.

Figure 5:
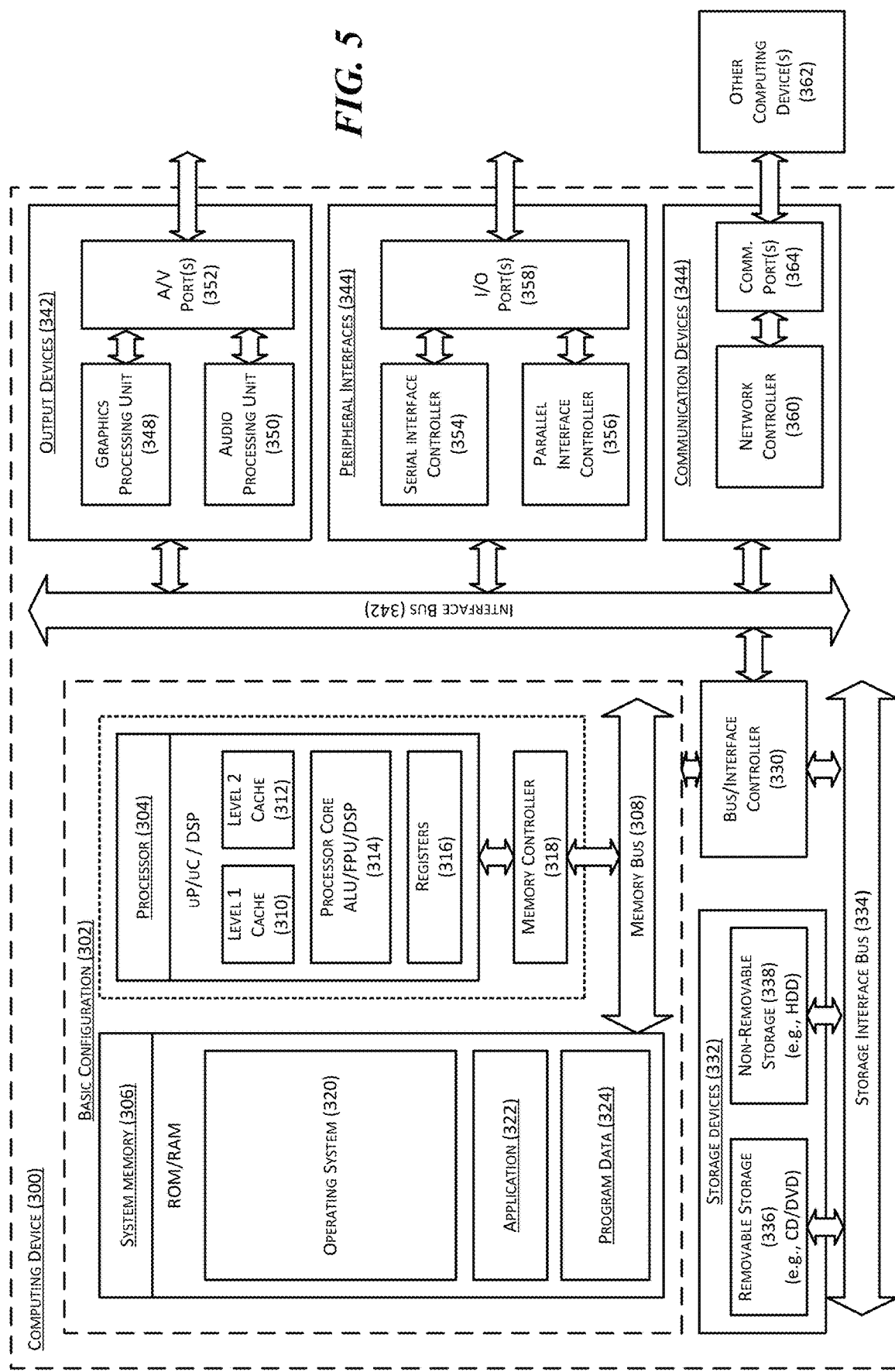
FIG. 5 is a computing device suitable for certain components of the computing system in FIG. 1.

FIG. 5 is a computing device 300 suitable for certain components of the distributed computing system 100 in FIG. 1. For example, the computing device 300 can be suitable for the client device 102, the email server 105, and the file server 106 of FIG. 1. In a very basic configuration 302, the computing device 300 can include one or more processors 304 and a system memory 306. A memory bus 308 can be used for communicating between the processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for calling a web service provided by a target server interconnected to an intermediate server and a client device by a computer network, the method comprising:
   receiving, at the intermediate server, a request from the client device to the web service at the target server, the client device does not have access to a valid authentication token to the web service at the target server;
   in response to receiving the request, at the intermediate server,
      authenticating the received request from the client device; and
      upon successful authentication of the received request, forwarding the request to the target server and invoking the web service at the target server to process the forwarded request, wherein the intermediate server is authenticated with the target server;
      receiving, at the intermediate server, data from the target server, the received data representing execution results of the request by the web service at the target server; and
      upon receiving the data, forwarding, from the intermediate server to the client device, the received data representing execution results of the request by the web service at the target server.

2. The method of claim 1 wherein:
   the web service is configured as an Application Programming Interface ("API") at the target server; and
   receiving the request includes receiving the request having data in a data structure corresponding to a data structure of the API.

3. The method of claim 1 wherein:
   the web service is configured as an Application Programming Interface ("API") at the target server for providing access to files stored at the target server; and
   receiving the request includes receiving the request having data in a data structure corresponding to a data structure of the API, the data including an identification of a file, a Universal Resource Locator ("URL") of the file, and a command related to an operation to be performed on the file by the web service.

4. The method of claim 1 wherein:
   the web service is configured to provide access to files stored at the target server;
   the intermediate server is an email server interconnected to the client device via the computer network;
   receiving the request includes receiving a request that represents a user clicking on a link to a file in an email outputted in an email client on the client device; and
   wherein the email client does not have access to the valid authentication token to the target server.

5. The method of claim 1 wherein:
   the web service is configured as an Application Programming Interface ("API") at the target server;
   receiving the request includes receiving the request having data in a data structure corresponding to a data structure of the API; and
   forwarding the request to the target server includes forwarding the request to the target server without modifying the received request from the client device.

6. The method of claim 1 wherein:
   the web service is configured as an Application Programming Interface ("API") at the target server;
   receiving the request includes receiving the request having data encapsulated by a header, the data being in a data structure corresponding to a data structure of the API; and
   forwarding the request to the target server includes:
   removing the header from the received request; and
   forwarding the request with the header removed to the target server.

7. The method of claim 1 wherein:
   the web service is configured as an Application Programming Interface ("API") at the target server;
   receiving the request includes receiving the request having data in a data structure corresponding to a data structure of the API; and
   forwarding the request to the target server includes:
      forwarding the data in the data structure of the request to the target server; and
      invoking the web service by calling the API corresponding to the web service at the target server.

8. A method for calling a web service provided by a target server interconnected to an intermediate server and a client device by a computer network, the method comprising:
   receiving, at the client device, an input from a user representing a request to the web service at the target server; and
   in response to receiving the user input,
      determining whether a valid authentication token is accessible by the client device;
      in response to determining that a valid authentication token is not accessible by the client device, transmitting, to the intermediate server, the request to the web service at the target server along with an authentication token to the intermediate server, wherein the intermediate server is authenticated with the target server and is configured to forward the received request to the target server as an authenticated request; and
      receiving data from the intermediate server, the received data representing execution results of the request by the web service at the target server.

9. The method of claim 8 wherein:
   the web service is configured as an Application Programming Interface ("API") at the target server; and
   transmitting the request includes transmitting the request having data in a data structure corresponding to a data structure of the API.

10. The method of claim 8 wherein:
    the web service is configured as an Application Programming Interface ("API") at the target server for providing access to files stored at the target server; and transmitting the request includes transmitting the request having data in a data structure corresponding to a data structure of the API, the data including an identification of a file, a Universal Resource Locator ("URL") of the file, and a command related to an operation to be performed on the file by the web service.

11. The method of claim 8 wherein:
the web service is configured to provide access to files stored at the target server;
the intermediate server is an email server interconnected to the client device via the computer network; and
receiving the user input includes receiving an input that represents a user clicking on a link to a file in an email outputted in an email client on the client device.

12. The method of claim 8 wherein:
the web service is configured as an Application Programming Interface ("API") at the target server;
transmitting the request includes transmitting the request having data in a data structure corresponding to a data structure of the API; and
wherein the intermediate server is configured to forward the received request to the target server as an authenticated request without modifying the received request from the client device.

13. The method of claim 8 wherein:
the web service is configured as an Application Programming Interface ("API") at the target server;
transmitting the request includes transmitting the request having data encapsulated by a header, the data being in a data structure corresponding to a data structure of the API; and
wherein the intermediate server is configured to remove the header from the request before forwarding the request with the header removed to the target server.

14. The method of claim 8, further comprising transmitting the request directly to the target server with the valid authentication token in response to determining that a valid authentication token is accessible by the client device.

15. The method of claim 8, further comprising:
in response to determining that a valid authentication token is accessible by the client device,
transmitting the request directly to the target server with the valid authentication token to invoke the web service at the target server;
determining whether invocation of the web service is successful; and
in response to determining that invocation of the web service is not successful, transmitting, to the intermediate server, a copy of the request to the web service at the target server along with an authentication token to the intermediate server.

16. A computer server interconnected to a client device and a target server by a computer network, the target server being configured to provide a web service the computer server comprising:

a processor; and
a memory operatively coupled to the processor, the memory having instructions executable by the processor to cause the computer server to:
upon receiving a request to the web service at the target server from the client device having no access to a valid authentication token to the web service at the target server,
authenticate the received request from the client device;
upon successful authentication of the received request, forward the request to the target server and invoke the web service at the target server to process the forwarded request, wherein the computer server is authenticated with the target server;
receive, from the target server, data representing execution results of the request by the web service at the target server; and
upon receiving the data, forward, to the client device, the received data representing execution results of the request by the web service at the target server.

17. The computer server of claim 16 wherein:
the web service is configured as an Application Programming Interface ("API") at the target server; and
the received request includes data in a data structure corresponding to a data structure of the API.

18. The computer server of claim 16 wherein:
the web service is configured as an Application Programming Interface ("API") at the target server;
the received request includes data in a data structure corresponding to a data structure of the API; and
to forward the request to the target server includes to forward the request to the target server without modifying the received request from the client device.

19. The computer server of claim 16 wherein:
the web service is configured as an Application Programming Interface ("API") at the target server;
the received request includes data in a data structure corresponding to a data structure of the API encapsulated by a header; and
to forward the request to the target server includes to:
remove the header from the received request; and
forward the request with the header removed to the target server.

20. The computer server of claim 16 wherein:
the web service is configured as an Application Programming Interface ("API") at the target server;
the received request includes data in a data structure corresponding to a data structure of the API; and
to forward the request to the target server includes to:
forward the data in the data structure of the request to the target server; and
invoke the web service by calling the API corresponding to the web service at the target server.

* * * * *